United States Patent [19]

Dauvergne

[11] 4,252,207
[45] Feb. 24, 1981

[54] ASSISTED STEERING DEVICE FOR A VEHICLE

[75] Inventor: Jean L. R. Dauvergne, Fosses, France

[73] Assignee: Societe Anonyme Francaise du Ferodo, Paris, France

[21] Appl. No.: 14,211

[22] Filed: Feb. 22, 1979

[30] Foreign Application Priority Data

Feb. 23, 1978 [FR] France ................................ 78 05161

[51] Int. Cl.³ ............................................. B62D 5/08
[52] U.S. Cl. .................................. 180/132; 91/375 A; 180/163
[58] Field of Search ............... 180/132, 146, 147, 148, 180/149, 150, 151, 152, 153, 154, 155, 156, 157, 158, 159, 160, 161, 162, 163; 91/375 A; 132/625.24

[56] References Cited

U.S. PATENT DOCUMENTS

| 3,616,727 | 11/1971 | Suzuki | 91/375 A |
| 3,746,045 | 7/1973 | Bunker | 91/375 A |
| 4,048,904 | 9/1977 | Kawabata | 91/375 A |
| 4,169,515 | 10/1979 | Presley | 91/375 A |

Primary Examiner—John J. Love
Assistant Examiner—Randall A. Schrecengost
Attorney, Agent, or Firm—Young & Thompson

[57] ABSTRACT

The invention relates to a power-assisted steering arrangement in which the power-assisting mechanism is controlled in response to a limited relative angular movement which takes place between two parts of a control element such as a steering column. According to the invention, a coupling interconnecting the two parts in a manner which provides the limited angular displacement comprises external teeth formed on the two adjacent ends of the parts, and a connecting part such as a sleeve, or a disc with a central bore, which is provided with internal teeth which engage the external teeth of the two parts. A limited amount of play is present between the internal teeth and one or both sets of external teeth to provide for the relative angular displacement of the two parts.

9 Claims, 10 Drawing Figures

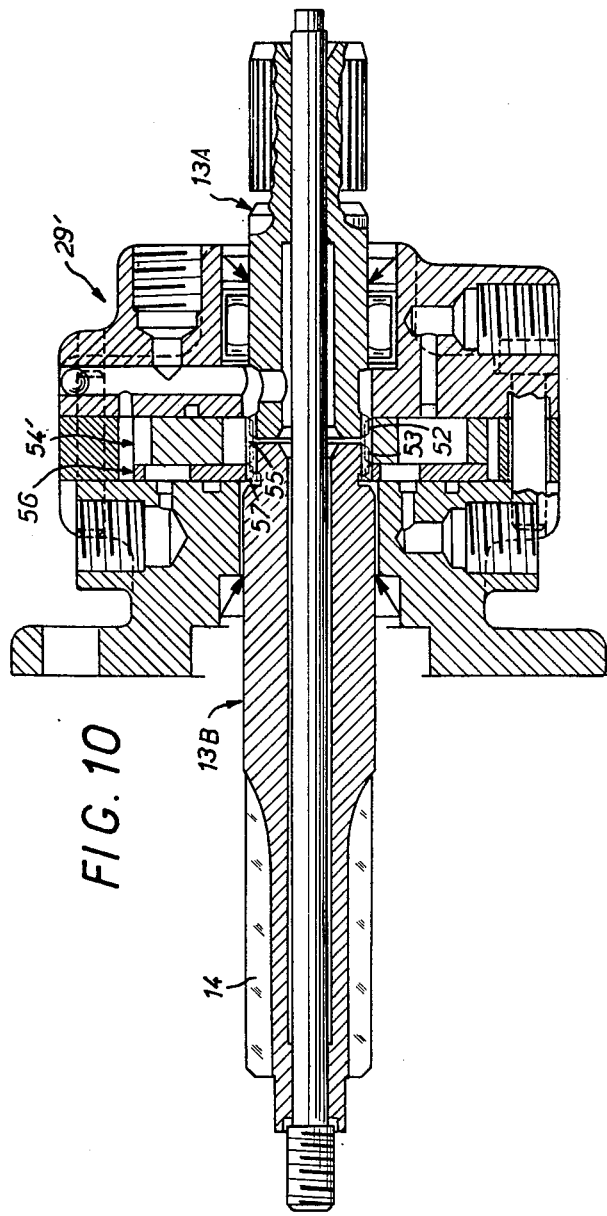

ASSISTED STEERING DEVICE FOR A VEHICLE

BACKGROUND OF THE INVENTION

This invention relates to an assisted steering device for a vehicle, comprising control means acting on direction changing means, the said control means having a transmission element in two parts which are capable of limited relative angular movement which results in angular offsetting of the said parts under the action of the control means, and assistance means which, in response to this angular offsetting, are operable to act on the direction changing means in the same sense as the control means.

The arrangements proposed hitherto for providing and limiting this relative angular movement are generally fragile and/or complex in construction.

Such arrangements consist, for example, of a linchpin provided on one of the parts and engaging in an opening in the other part. However, this arrangement reduces the strength of the construction.

It has also been proposed to provide external teeth on one of the parts and to engage them with narrower internal teeth of the same pitch which are provided in a blind bore in the other part. This other part has a larger external diameter at the location of the blind bore, which makes it more complex in form and increase its radial dimensions. Moreover, the provision of internal teeth or grooves in a blind bore is difficult to accomplish and presents the problem of removing all the material machined out from the bottom of this blind bore.

The present invention provides an assisted steering device which does not have these drawbacks and in which the limited relative angular play between the two parts of the transmission element is provided in a particularly simple and robust manner.

SUMMARY

According to the invention, the device is characterised in that the two relatively movable transmission parts respectively comprise two ends which are located adjacent each other and which are provided with external teeth, whilst a single outer part, having internal teeth, engages these two sets of external teeth, with angular play on at least one of them. This play may be on either of the sets of teeth and may be greater on one set than on the other or, preferably, equal on both sets. It is also possible for the play to be provided on only one of the two sets of external teeth.

With the arrangement according to the invention, the ends of two parts located near each other are of similar structure and comprise external teeth, which are easier to provide than internal teeth in a blind bore. On the other hand, the internal teeth are easy to provide on the additional outer part provided for this purpose. This part may be simple in shape, with the grooves emerging on both sides, e.g. it may consist of a cylindrical sleeve or, according to a variant, a disc. The latter may be used for another function, e.g. as an element of a hydraulic distributor for the assistance means.

BRIEF DESCRIPTION OF THE DRAWINGS

FIGS. 6 and 7 are analogous to FIGS. 4 and 5, but show a variant;

FIGS. 8 and 9 are analogous to FIGS. 4 and 5 or FIGS. 6 and 7, but show yet another variant;

FIG. 10 shows yet another variant.

DESCRIPTION OF THE PREFERRED EBMODIMENTS

Figure 1:
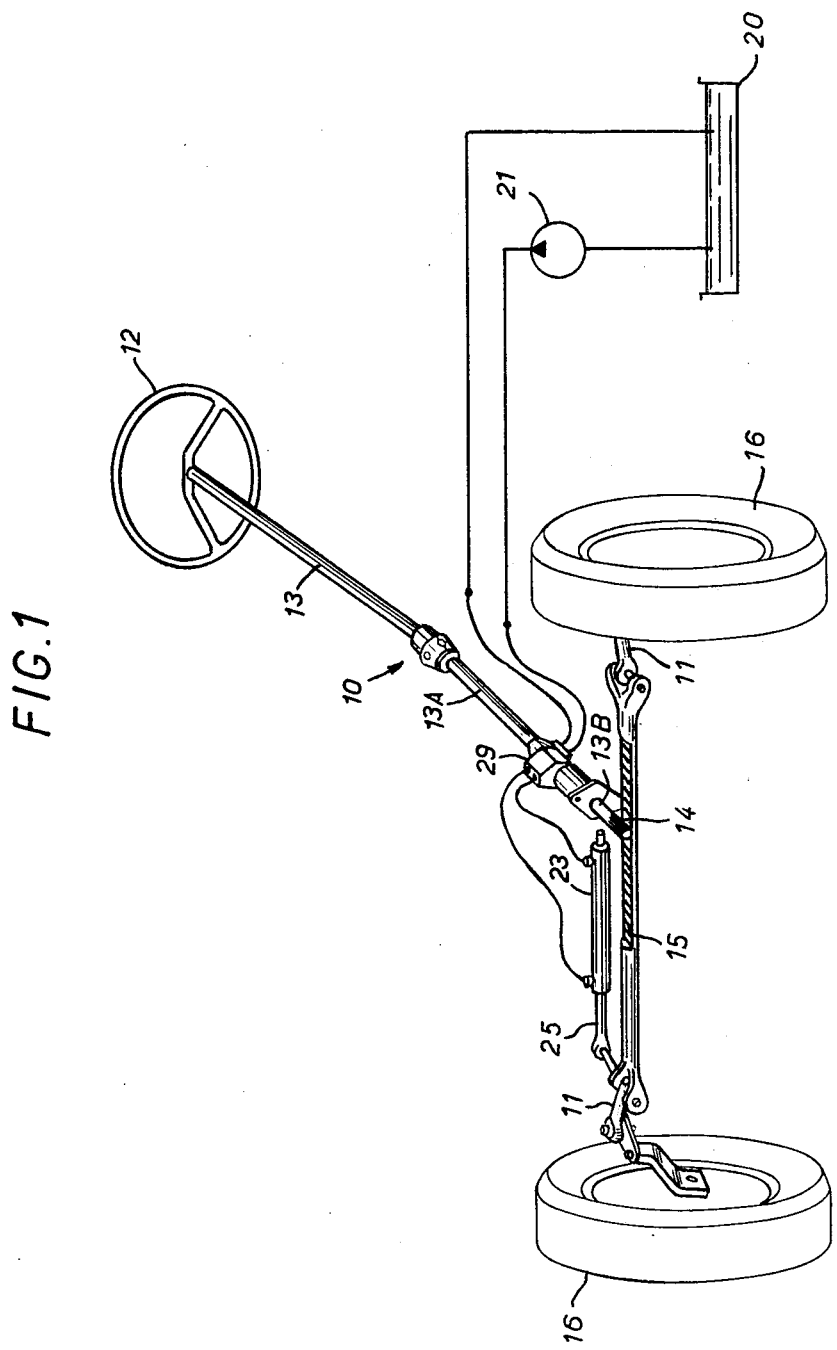
FIG. 1 is a schematic perspective view of an assisted steering device for a motor vehicle according to the invention.

In the embodiment shown in FIGS. 1 to 5, an assisted steering device according to the invention is shown, by way of example, applied to a motor vehicle.

The device comprises (FIG. 1) control means 10 acting on direction changing means such as track rods 11. The control means 10 comprise a steering wheel 12 and a steering column 13. The latter comprises two aligned parts 13A and 13B coupled to each other but capable of limited relative angular movement which permits angular offsetting of the parts 13A and 13B under the action of the control means 10. The part 13A is integral with the steering wheel 12, whilst the part 13B is integral with a pinion 14 which meshes with a toothed rack 15. The latter controls the orientation of the guiding wheels 16 of the vehicle via the track rods 11.

A hydraulic assistance system (FIGS. 1 and 2) comprises a reservoir 20 and a pump 21 drawing from this reservoir 20. A hydraulic jack 23 has a piston 24 the piston rod 25 of which acts on the toothed rack 15. The piston 24 defines two chambers 26 and 27 in the jack 23. A hydraulic distributor 29 is interposed between the pump 21 and the jack 23 and is responsive to angular offsetting of the two parts 13A and 13B so as to direct fluid to the jack 23 and thereby operate the jack to act on the direction changing rods 11 in the same sense as the control means 10.

Figure 2:
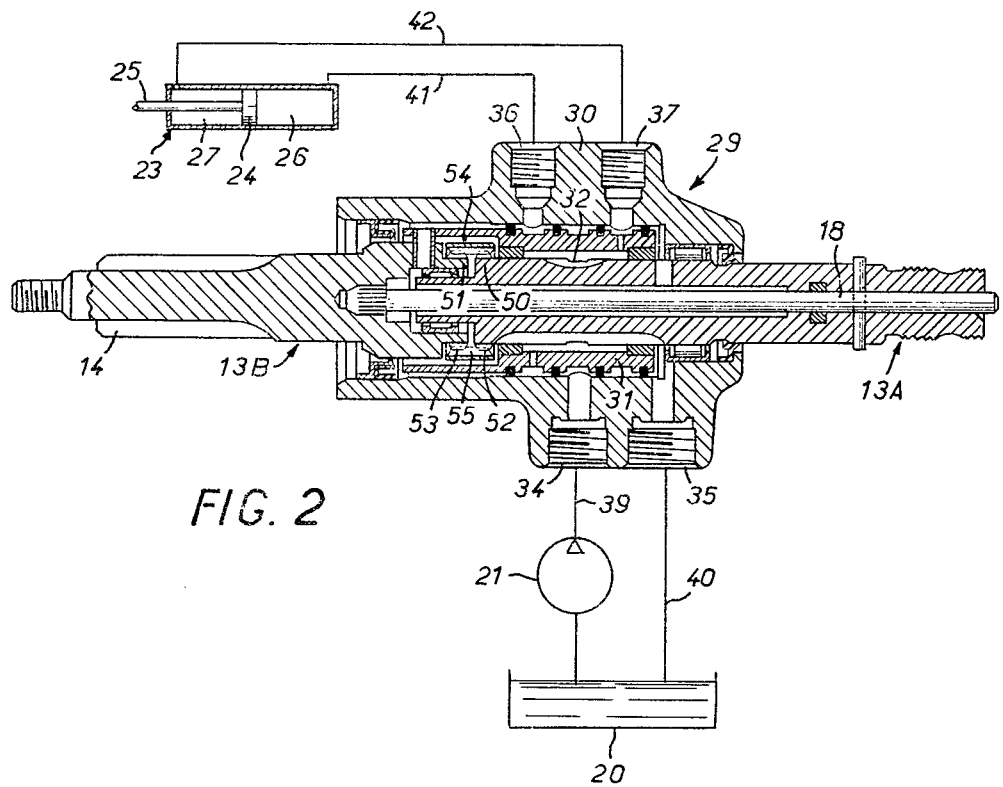
FIG. 2 is a view of this device in longitudinal section.

The hydraulic distributor 29 may be of any suitable form. It may comprise, for example as shown in FIG. 2, a body 30 surrounding the parts 13A and 13B and a tubular sleeve 31 located between the part 13A and this body 30. Various suitably distributed slots, such as the slot 32, are provided in the parts 13A and 31.

The body 30 includes four orifices 34, 35, 36 and 37. The orifice 34 is connected to a lift duct 39 of the pump 21. The orifice 35 is connected to a return duct 40 leading to the reservoir 20. The orifice 36 is connected, via a duct 41, to the chamber 26 of the jack 23. The orifice 37 is connected, via a duct 42, to the chamber 27 of the jack 23.

Figure 3:
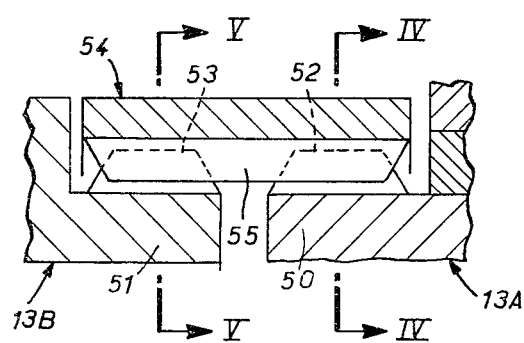
FIG. 3 is a view on a larger scale of the means for providing limited relative angular play between the two parts of the steering column.

In order to provide the limited relative angular play needed to operate the distributor, the two parts 13A and 13B are coupled with such play. These parts 13A and 13B respectively comprise two ends 50 and 51 located adjacent each other (FIG. 3). The end 50 is formed with external teeth 52 and, in the same way, the end 51 is formed with external teeth 53.

The teeth 52 and 53 have the same pitch. A sleeve part 54 extends between the ends 50 and 51 and has internal teeth 55 having the same pitch as the teeth 52 and 53; the internal teeth 55 engage with the latter sets of teeth, with angular play on at least one of them.

Figure 4:
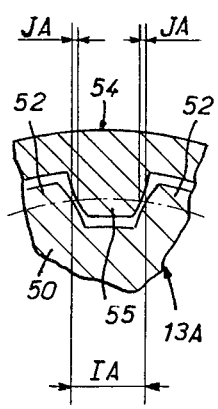
FIGS. 4 and 5 are corresponding views in section along the lines IV—IV and V—V, respectively, in FIG. 3.
Figure 5:
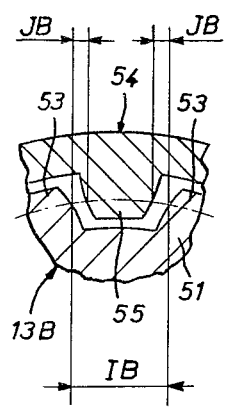

In the embodiment shown in FIGS. 4 and 5, the teeth 55 engage with the teeth 52 and 53 with angular play 2

JA on the teeth 52 and angular play 2 JB on the teeth 53. The teeth of the set of teeth 52 are thicker than those of the set of teeth 53, resulting in smaller intervals IA between the teeth 52 than the intervals IB between the teeth 53, the play 2 JB being greater than the play 2 JA.

It will be appreciated that the total angular play between the parts 13A and 13B is thus 2 JA+2 JB, i.e. twice the value $V=JA+JB$, which is provided in each direction, starting from a central rest position. The parts are urged towards this central position by means of a torsion bar 18 (FIG. 2) which elastically connects the two parts 13A and 13B to each other. In practice, the value V is a few degrees.

In another embodiment (FIGS. 6 and 7), JA=JB and IA=IB, which has the advantage of giving a more standardised construction in which the teeth 52 and 53 are identical.

In yet another embodiment (FIGS. 8 and 9) the teeth 55 engage without play on the teeth 52 and with play of 2 JB of the teeth 53.

In every case, the arrangement is such that the value $V=JA+JB$ corresponds exactly to a desired predetermined value of movement of a few degrees from the central rest position.

In FIG. 3, as in FIGS. 4, 5 or 6, 7 or 8, 9, the part 54 consists of a simple internally-toothed thin cylindrical sleeve which may have a certain degree of axial freedom and is easily incorporated in the body of the distributor 29.

It will be appreciated that the means 52, 53 and 55 for providing the limited relative angular play are of a particularly simple construction. The teeth 52 and 53, which are provided on the outside, are easily machined on the parts 13A and 13B. On the other hand, the internal teeth 55 are easily produced on the sleeve 54, e.g. by drifting, thanks to the simple form of this sleeve.

When the driver does not take any action, the orifices 34 and 35 are brought into communication, so that the system functions with an open centre, with no effect on the jack 23. When the driver turns the steering wheel 12 in order to change the direction of the wheels 16, the parts 13A and 13B are angularly offset relative to each other in a direction determined by the action on the steering wheel and the distributor 29 transmits the pressure of the pump 21 into the corresponding chamber 26 or 27 of the jack 23 and ensures the return from the other chamber to the reservoir 20. When the angular offset is reversed, the other chamber of the jack 23 is supplied by the pump 21.

If the assistance means should break down, the action on the steering wheel 12 to change direction first of all has the effect of absorbing the limited relative angular play between the parts 13A and 13B, whilst overcoming the elastic resistance presented by the torsion bar 18, and then, at 52-55-53, rotationally driving the part 13B integrally with the part 13A, thus changing direction.

In the variant shown in FIG. 10, the arrangement is analogous to that described above with reference to FIGS. 1 to 9, and reference numerals 52 and 53 designate the teeth on the ends 50 and 51 of the parts 13A and 13B. However, in this case, the outer part engaging with its internal teeth 55 on the teeth 52 and 53 is made up of a rotor disc 54' of a hydraulic distributor 29', which incorporates another rotor disc 56 having internal teeth 57 which engage without play in the teeth 53.

I claim:

1. An assisted steering device for a vehicle, comprising control means acting on direction changing means, the said control means having an transmission element in two parts which parts are capable of limited relative angular displacement permitting angular offsetting of the parts under the action of the said control means, and assistance means which, in response to such angular off-setting, are operable to act on the direction changing means in the same sense as the control means, characterised in that the said parts respectively comprise two ends located adjacent each other and provided with external teeth, and an external part is provided having internal teeth engaging the said two sets of external teeth provided on the transmission element parts, angular play being present between said internal teeth and at least one of the said sets of external teeth.

2. A device as claimed in claim 1, characterised in that the said external part engages the said two sets of external teeth with angular play on both sets.

3. A device as claimed in claim 2, characterised in that the said angular play is greater on one of the two said sets of external teeth than on the other.

4. A device as claimed in claim 2, characterised in that the said angular play is equal on both said sets of external teeth.

5. A device as claimed in claim 1, characterised in that the said external part having internal teeth engages with play on one of said sets of teeth and with no play on the other set.

6. A device as claimed in claim 1, characterised in that the said external part comprises an internally-toothed cylindrical sleeve.

7. A device as claimed in claim 1, characterised in that the said external part comprises a disc having an internally-toothed bore.

8. A device as claimed in claim 7, wherein the said assistance means comprise a hydraulic system having a pump and a reservoir, a hydraulic jack acting on the said direction changing means and a hydraulic distributor interposed between the system and the jack, and said disc comprises a rotor disc of the said distributor.

9. A device as claimed in claim 8, characterised in that the said distributor comprises a second rotor disc which engages without play with the set of external teeth which receives the first rotor disc with the said limited relative angular play.

* * * * *